W. JAMESON.
APPARATUS FOR TESTING RUBBER.
APPLICATION FILED DEC. 7, 1917.
1,282,085.
Patented Oct. 22, 1918.
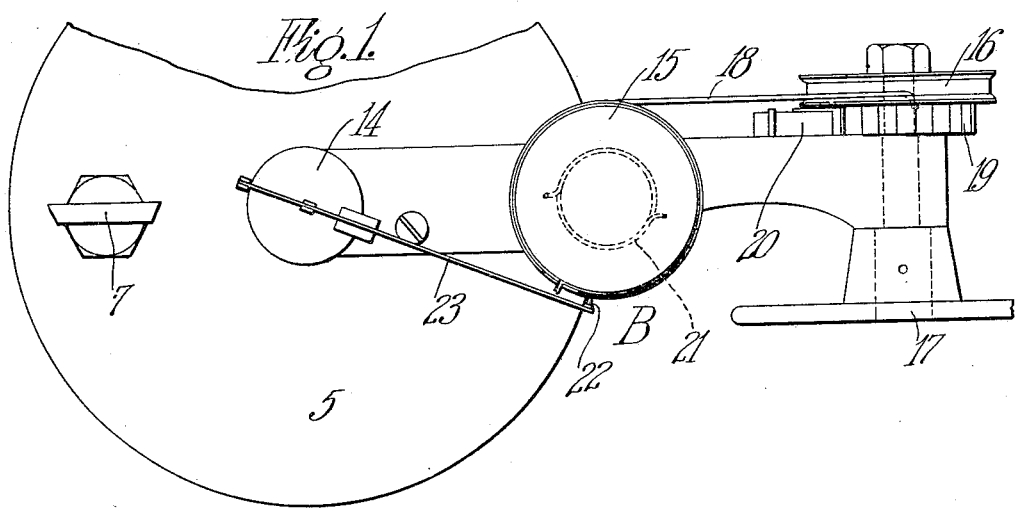
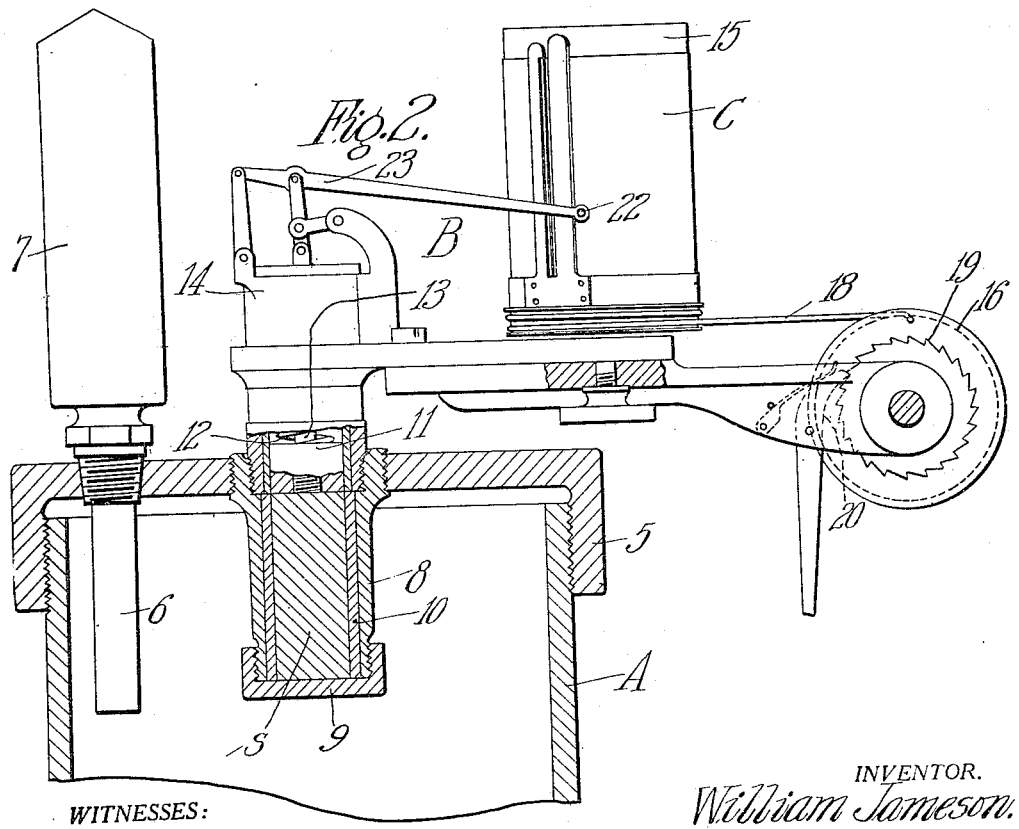
WITNESSES:
W. C. Ross.
INVENTOR.
William Jameson.
BY Chapin + Neal
ATTORNEYS.

UNITED STATES PATENT OFFICE.

WILLIAM JAMESON, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

APPARATUS FOR TESTING RUBBER.

1,282,085.

Specification of Letters Patent. Patented Oct. 22, 1918.

Application filed December 7, 1917. Serial No. 206,065.

*To all whom it may concern:*

Be it known that I, WILLIAM JAMESON, of Springfield, in the county of Hampden and State of Massachusetts, have invented certain new and useful Improvements in Apparatus for Testing Rubber, of which the following is a specification.

This invention relates to testing apparatus and more particularly to such apparatus as is designed to indicate or record the expansion of material under heat.

The object of the invention is to provide a conveniently operable apparatus for accurately indicating and recording the expansion of materials, such as rubber, during the process of vulcanization, as will hereinafter be more particularly pointed out and claimed.

The invention, in an embodiment at present preferred, is disclosed for illustrative purposes in the accompanying drawings, in which—

Figure 1 is a plan view of the apparatus, and

Fig. 2 is an elevational view, partly in section, of Fig. 1.

Referring to these drawings, A represents a suitable vulcanizing chamber in which a suitable heating medium, as steam, may be circulated in the usual and known manner. Chamber A is provided with a removable cap 5, and the latter supports a thermometer-well 6, to which a suitable thermometer 7 may be connected in the usual manner. The thermometer and its well have been shown merely in diagrammatical form, and any other means for indicating, from outside the chamber A the temperatures which obtain therein, may be used as desired.

B represents generally a suitable pressure indicating device. The lower sleeve portion 8 of this device is secured to chamber cap 5. The sleeve portion 8 is provided with a cap 9 at the lower end and is hollow to receive the bushing 10. This bushing fits loosely within the sleeve and is of such accurate and uniform diameter and length as to be capable of receiving a cylindrically shaped specimen of uncured rubber of an exact and measured volume, as for example, a cubic inch. The piston 11 of the indicator rests on top of specimen *s* therein, and is held in abutting relation against the specimen by the usual spring 12 coiled around the piston rod 13 and disposed within the indicator cylinder 14.

The indicator drum 15 is of the usual form except for its actuating means, which in this apparatus is preferably made intermittent and manually operable. Thus, a drum 16, manually operable from a hand wheel 17, is connected by a cord 18 to the indicator drum. There is also provided a ratchet 19 rotatable with drum 16 and a spring pressed pawl 20, the elements 19 and 20 coöperating to hold drum 15 against rotation in one direction under the force of the usual indicator drum torsional spring 21, which is represented conventionally in Fig. 1. It will thus be seen that drum 15 may be manually turned step by step in one direction and, when desired, may be automatically returned to normal position by the spring 21, when pawl 20 is released.

The drum 15 is adapted to receive, in the usual way, a record card *c*, and playing over the surface of the latter is a marking device 22 which is movable substantially vertically on the card by the piston 11 and the usual motion multiplying connections, indicated generally by reference numeral 23.

In operation, the specimen of uncured rubber to be tested is carefully prepared to closely fit within bushing 10, which may be conveniently removed for this purpose from either end of the sleeve 8 by removing cap 9 or the indicator B. The bushing 10 and removed parts are then replaced in their illustrated positions. Thereafter, a heating medium is admitted to chamber A to vulcanize or heat the specimen, while held in the confines of bushing 10. The experimentor, observing the thermometer 7, turns the drum 15 by means of wheel 17 step by step and gages these steps so that each corresponds to a known increment of temperature, as read from the thermometer 7. The specimen *s*, being held from expansion except in the one direction, moves piston 11 upwardly and actuates the marker 22, which records a vertical line proportional to the expansion of the specimen. Thus, a curve, wherein the ordinates represent expansion and the abscissae temperatures, may be conveniently recorded to show accurately the expansive action of a known volume of rubber during its curing or vulcanization, The invention has been disclosed herein, in the form at present preferred, for illustrative purposes, but the scope of the invention is defined by the appended claims rather than by the foregoing description.

What I claim is—

1. Apparatus for indicating the expansion of rubber and the like, comprising, a heating chamber, means to indicate the temperature therein, a receptacle in said chamber to contain a known volume of the rubber specimen to be tested and to confine the latter against movement except in one direction, and means engageable with the unconfined portion of the specimen and movable thereby to indicate the expansion of the latter, whereby the behavior of rubber during vulcanization may be observed.

2. Apparatus for indicating the expansion of rubber and the like, comprising, a heating chamber, means to indicate the temperature therein, a receptacle in said chamber to contain a known volume of the rubber specimen to be tested and to confine the latter against movement except in one direction, means engageable with the unconfined portion of the specimen, and mechanism operable from the last-named means to record on an enlarged scale the expansion of the specimen, said mechanism including a part adapted to be operated step by step in accordance with the indications of the first-named means, whereby a temperature-expansion record of the behavior of the rubber during vulcanization may be obtained.

3. Apparatus for indicating the expansion of rubber and the like during vulcanization, comprising, a vulcanizing chamber, means to indicate the temperature therein, a receptacle in said chamber closed at one end and adapted to contain and confine except in one direction a measured volume of the specimen to be tested, a cylinder removably closing the other end of the receptacle, a piston in the cylinder, means holding the latter in abutment with the unconfined portion of the specimen, means including motion multiplying devices to record the increments of movement of the piston under the expansion of the specimen, and means adapted to be operated in accordance with the indications of the first-named means to record increments of temperature.

4. Apparatus for indicating the expansion of rubber and like plastic materials, comprising, a casing, the interior of which constitutes a heating chamber, a pocket provided in the casing and extending into the chamber, said pocket being closed except for one end which opens to the exterior of the casing, a tube removably mounted in said pocket and having one end closed by the latter, said tube adapted to receive a known volume of the specimen to be tested, and expansion indicating means detachably connected to the casing to close the open end of said pocket, said means including a part engageable with the unconfined end of the specimen in said tube and operable by expansion of the specimen to actuate the indicating means.

WILLIAM JAMESON.